(No Model.)

I. N. ROTHROCK.
WHEEL HUB.

No. 517,241. Patented Mar. 27, 1894.

Witnesses

Inventor
Isaac N. Rothrock,
By his Attorneys,

UNITED STATES PATENT OFFICE.

ISAAC N. ROTHROCK, OF MORRISDALE MINES, PENNSYLVANIA, ASSIGNOR OF ONE-FOURTH TO MAHLON P. FLEGAL, OF SAME PLACE.

WHEEL-HUB.

SPECIFICATION forming part of Letters Patent No. 517,241, dated March 27, 1894.

Application filed September 30, 1892. Serial No. 447,400. (No model.)

*To all whom it may concern:*

Be it known that I, ISAAC N. ROTHROCK, a citizen of the United States, residing at Morrisdale Mines, in the county of Clearfield and State of Pennsylvania, have invented a new and useful Hub, of which the following is a specification.

The invention relates to improvements in hubs.

The object of the present invention is to simplify and improve the construction of hubs, and to enable the spokes of a wheel to be readily removed when worn or broken and to facilitate their ready replacement by new spokes.

The invention consists in the construction and novel combination and arrangement of parts hereinafter fully described, illustrated in the accompanying drawings and pointed out in the claim hereto appended.

Figure 1:
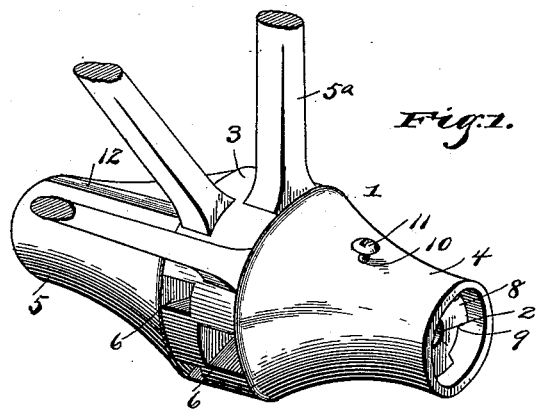
Figure 2:
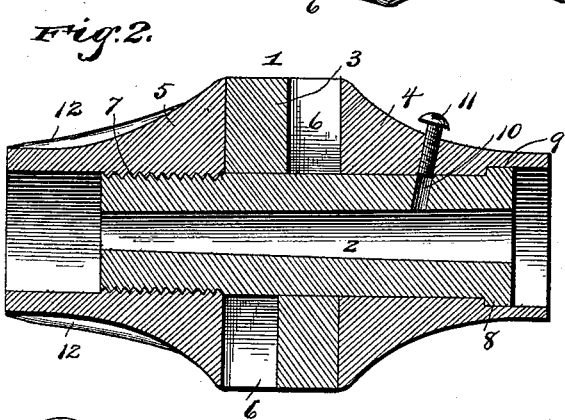
Figure 3:
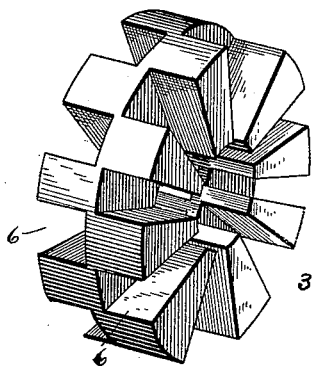
Figures 4, 5, 6:
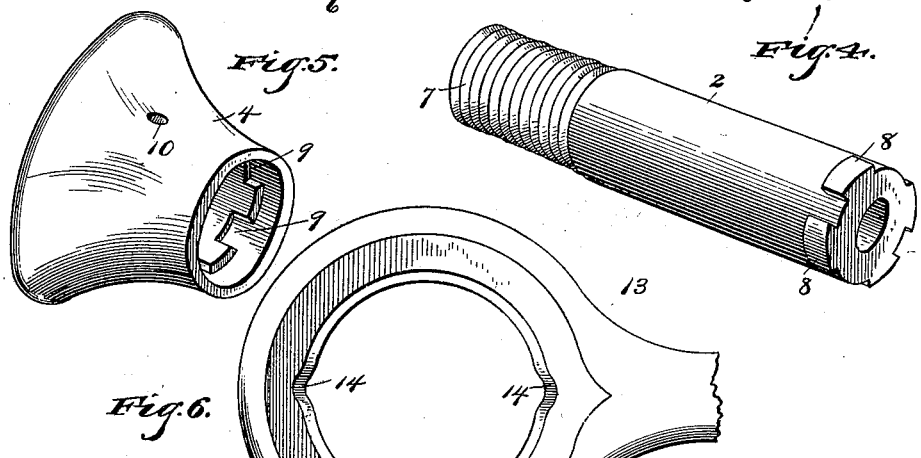

In the drawings—Figure 1 is a perspective view of a hub embodying the invention. Fig. 2 is a sectional view taken longitudinally of the hub. Fig. 3 is a detail perspective view of the spoke socket ring. Fig. 4 is a similar view of the axle box. Fig. 5 is a detail perspective view of the inner section of the hub. Fig. 6 is a detail view of a portion of the wrench.

Like numerals of reference indicate corresponding parts in all the figures of the drawings.

1 designates a hub comprising an axle box section 2 a central independent spoke socket ring 3, inner and outer hub sections 4 and 5 arranged on the ends of the axle box 2 and clamping between them the spoke socket ring and securing spokes 5ª in the socket 6 thereof. The independent spoke socket ring 3 is provided at opposite sides with the spoke sockets 6 and the spokes 5ª which are arranged therein are staggered. The spoke sockets have open tops and outer sides or fronts, and rear and side walls, thereby forming a complete tapering socket in which the spokes may be securely clamped. Each socket is separate and independent of the others and the rear and side walls are integral and connected. The outer portion 7 of the axle box is exteriorly threaded and has screwed on it the outer section 5 which is interiorly threaded; and the inner end of the axle box is provided with radial lugs 8 which fit in corresponding recesses 9 of the inner section 4. The radial lugs 8 have curved outer faces, and the corresponding recesses 9 of the inner section are formed in its interior and form a circular series. The outer terminus of the bore or opening of each hub section is smooth and that of the inner hub section is slightly enlarged.

In assembling the parts of the hub the inner section is first placed in position on the axle box, and is moved on the same to the inner end thereof until its recesses are engaged by the radial lugs 8 whereby the inner section of the hub is rigidly secured to the axle box.

The hub is provided with an oil hole or cup 10, which extends through the inner section 4 and the axle box 2, and it is closed at the outer end by a screw 11. The outer section is provided on its exterior with diametrically opposite disposed ribs 12, whereby the outer section is adapted to be engaged by a wrench 13 for unscrewing it. The wrench fits on the outer section and is provided with grooves 14 which correspond to the ribs 12.

It will readily be apparent that the hub is simple and inexpensive in construction, and that its parts may be readily separated and assembled.

What I claim is—

A hub comprising a tubular axle-box, exteriorly screw-threaded at its outer end and provided at its inner end with radial, spaced lugs, 8, having curved or rounded outer surfaces concentric with the axle-box, an inner hub-section having a smooth bore to fit the smooth portion of the axle-box and provided at its inner end with an enlarged bore forming a shoulder having spaced recesses or notches, 9, to receive the radial lugs, 8, a smooth-bored spoke-socket ring, fitted upon the axle-box adjacent to the enlarged or flared outer end of the inner hub-section, and of equal diameter with said flared end, the ring being provided with alternately-disposed spoke-sockets which open, alternately, at opposite sides of the ring, spokes fitting in the sockets with their exposed sides flush with the corresponding surfaces of the ring, and the outer hub-section, threaded upon the outer end of the axle-box and having a flared inner end, of equal diameter with the socket ring, to bear against the outer side of the latter, whereby the ring is clamped between the hub-sections and the spokes are held in place in their sockets by contact with the contiguous ends of the sections, the inner section being further provided with an oil-hole, registering with a corresponding perforation in the axle-box and fitted with a removable plug, and the outer section being provided with diametrically opposite, longitudinally-disposed ribs for the engagement of a wrench to facilitate the disassembling of the parts, substantially as specified.

In testimony that I claim the foregoing as my own I have hereto affixed my signature in the presence of two witnesses.

ISAAC N. ROTHROCK.

Witnesses:
D. R. HOUSE,
JOHN WESLEY TATE.